Nov. 14, 1944.   D. L. BENNETT   2,362,530
FILTER
Original Filed Feb. 15, 1939
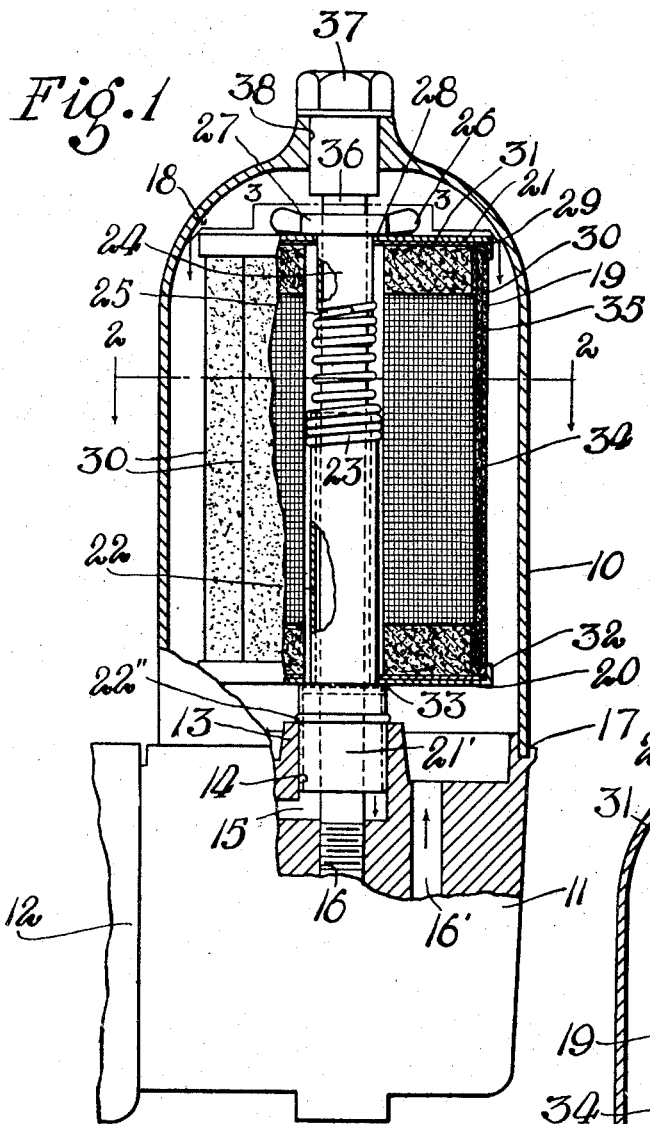
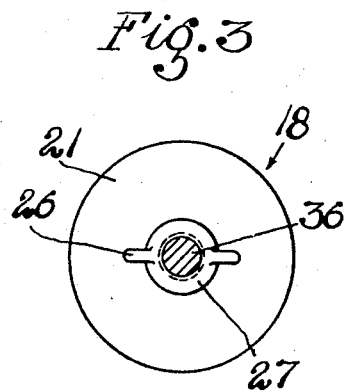
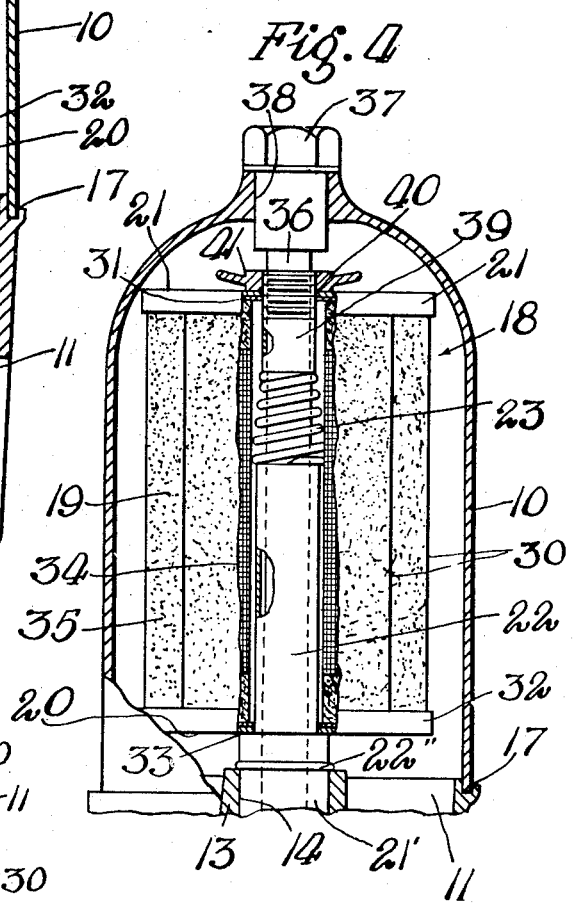
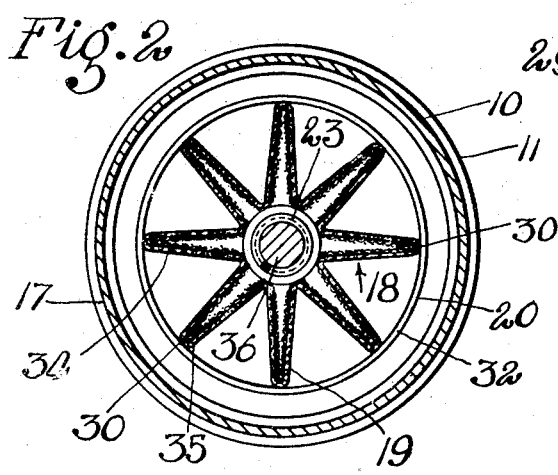
Inventor
Dale L. Bennett
By Paul Q. Pippel
Atty.

Patented Nov. 14, 1944

2,362,530

UNITED STATES PATENT OFFICE 2,362,530

FILTER

Dale L. Bennett, Chicago, Ill., assignor to International Harvester Company, a corporation of New Jersey Original application February 15, 1939, Serial No. 256,406. Divided and this application August 31, 1942, Serial No. 456,768

7 Claims. (Cl. 210—183)

This invention has to do with filter devices for removing foreign particles as from the oil in engine lubricating systems, and relates more particularly to a new filter unit capable of disassembly for the removal and replacement of a filter element, together with an improved resilient releasable fastening means for holding the unit assembled. The subject hereof is a divisional part of my copending application Serial No. 256,406, filed February 15, 1939, for Filters.

One of the major problems in operating internal combustion engines, particularly under dusty conditions, such as are encountered by tractors used for construction work and agricultural purposes, has been to keep the oil sufficiently free of dirt and abrasive particles to assure long wear of the bearings, rings and pistons. Various types of filter elements have been utilized. One of the major objections has been that the elements are not changed when they become clogged and dirty and they are no longer effective to accomplish a desired filtering.

The general object of this invention is the provision in an oil filter device of a filter element replaceably held in an operable position by a novel spring-pressed mounting that assures proper sealing about the edges of the filter element, though a wide tolerance prevails with respect to its dimensions and those of such mounting.

A more specific object is the provision of a mounting having axially spaced tubular counterparts disposed within a generally tubular filter element and yieldingly held by an interconnecting spring against axial separation, for retaining sealing caps upon the ends of the filter element.

These and other desirable objects inherent to and encompassed by the invention will be more fully understood from the ensuing description with reference to the annexed drawing, wherein:

Figure 1 is a vertical cross-section taken through the center of a filter casing having mounted therein a filter unit incorporating the invention;

Figure 2 is a cross-section taken on the line 2—2 of Figure 1;

Figure 3 is a sectional view on line 3—3 of Figure 1, showing the top of the filter unit; and Figure 4 is a vertical section similar to Figure 1, showing a modified form of clamping means for the filter element.

A filter casing 10 is shown mounted on a base 11 integrally or otherwise connected to a portion of the block 12 of an internal combustion engine. The base construction and the circulating system of a filter mounting of this type is well known in the prior art, being shown for example in the Liddell Patent 1,913,401, June 13, 1933. The base 10 is provided with a central boss 13 having a vertical bore 14 formed therein. A conduit 15 communicates with the bore for delivering oil which has been filtered from the bore. A threaded bore 16 is formed at the bottom of the boss 13 concentric with respect to the bore 14.

An inlet 16' is shown through which oil to be filtered is delivered to the filter casing. A channel 17 is formed around the outer edge of the base 11 to receive the lower wall of the casing 10. A gasket may be inserted in this channel to form an oil-tight seal.

The filter unit, designated in its entirety by the reference character 18, consists essentially of a filter element 19, a bottom plate 20, a top plate 21, a center tube or fastening means member 22, a spring 23, and a tubular clamping or fastening means member 24. The center tube 22 is provided with an enlarged end 21', which slips into the boss 13 with a ridge or ledge 22'' on the enlarged end portion abutting the top of the boss 13 to form a positive stop and support.

The spring 23 is rigidly secured to the upper end of the tube 22. The upper end of the spring is threaded onto a spiral groove 25 formed on the tubular clamping element or member 24. Thumb nut extensions 26 are formed on an enlarged head 27 of the clamping member 24 for unscrewing the member from the spring. Said enlarged head provides a shoulder 28, which abuts against the top of the top sealing plate 21. Said plate is provided with a downwardly extending flange 29 acting to engage the outer edges of the folded portions 30 of the filter element, preventing said portions from moving radially outwardly. Sealing gaskets 31 are positioned inside the top sealing plate 21 and above the bottom sealing plate 20, abutting the edges of the filter element 19.

The bottom plate 20 is provided with an upwardly extending flange 32, which serves the same purposes as the flange 29. Said plate is provided with a central opening through which the center tube extends. Said plate rests on a shoulder 33 formed by the enlarged portion 21' of the center tube 22.

The filter element, which may be termed as star-shaped, may be of any suitable construction, a preferable form being shown as consisting of a screen wire 34, or similar reticulated material being capable of withstanding a substantial end thrust to thereby maintain the filter element in rigid position for clamping and to prevent collapsing of the element by oil under pressure. To complete the filter element, the screen is covered with a layer of filter paper 35 of a particularly formed substance adaptable to effectively filter the oil of the undesirable constituents and also to not clog, whereby the filter has a sufficiently long period of effective life for the purpose for which it is to be utilized.

The casing 10 may be held on the base 11 by any suitable means. As shown in the drawing, a bolt 36 having a head 37 extends through an opening 38 in the top of the casing 10 and vertically downwardly through the tubular securing member 24 and through the tube 22, being threaded into the threaded bore 16. A sealing gasket in the form of a washer under the head 37 forms an oil-tight seal at the top of the casing. The bolt 36 extends with a tight fit through the member 24 and is spaced from the tube 22, which is larger in diameter than the securing member 24 in order to provide an annular passage for the escape of filtered oil.

When an operator desires to replace the filter element, the casing is removed and the filtering element 19 is then replaced by unscrewing the securing element 24, removing the top sealing plate 21, and removing and discarding the filter element, on a surface of which the dirt and other impurities collect in the form of a substantially compact gelatinous-like substance. A new element is then inserted, care being taken that the end edges of the filtering element abut the gaskets on the sealing plates. The securing element 24 is then threaded into the spring 23 until the desired tension is reached. Said tension is effective to engage the gaskets with the edges of the filter element to insure a liquid-tight seal. It is to be noted that the filter paper is brought over the edge of the supporting screen, thereby providing a resilient portion of filter paper, which engages the gasket to form a liquid-tight seal.

It may be desirable to remove the entire filtering unit in order to clean the supporting parts which are not discarded with the element. In this case, the center tube may be readily slipped from the supporting boss, facilitating the removal of the entire unit.

Figure 4 shows a modified construction essentially the same in principle and in operation as the form shown in Figures 1 to 3, inclusive. In this construction, a securing element 39 is in the form of an exteriorly threaded sleeve permanently secured at its lower end to the top of the spring 23. The upper threaded end of the sleeve extends through an opening 40 in the top sealing plate 21. A securing nut 41 is threaded on the securing member against the top of the sealing plate 21. The casing securing bolt 36 slidably fits in the securing member 39 in an oil-tight manner to prevent leakage of unfiltered oil therethrough. The lower end of the spring 23 is secured to the center tube 22. In other respects, the element of this modification is identical with the element previously described and is assembled and removed in the same manner.

Although applicant has shown and described only two preferred embodiments of his improved filter element mounting, it is to be understood that he claims as his invention all modifications falling within the scope of the appended claims.

What is claimed is:

1. A liquid filtering unit comprising a generally tubular filtering element, sealing plates covering the ends of said element and having respective openings, a rod extending axially through said element and also through said openings, tubular fastening means members disposed about said rod respectively in said sealing plate openings, one of said tubular members being closely fitted about the rod and within the opening of its associated end plate to prevent fluid leakage into the filter element through said opening, the other tubular member being closely fitted into its opening in the other sealing plate to prevent leakage therebetween but being axially spaced from said one tubular member and oversize with respect to said rod to provide a passage between such other tubular member and said rod communicative between the interior and exterior of the filter element, means on said tubular members for transmitting axially inward force to their associated sealing plates when said tubular members are urged axially toward one another, and a spring about the rod in connecting relation between said tubular members and under contracting tension for urging said tubular members axially together and thus yieldingly retaining said sealing plates against the respective ends of the filter element.

2. A liquid filtering unit comprising a hollow center tube, a sealing plate fitting on said tube, a tension spring secured to the center tube, a securing member adjustably threaded to said spring, said member having a shouldered end portion, a second sealing plate having an aperture and mounted on said securing member against the shoulder portion, and a filter element clamped between said sealing plates, said element being sufficiently rigid axially of the center tube to withstand clamping pressure.

3. A liquid filtering unit comprising a hollow center member, a bottom sealing plate fitting on said member, a tension spring secured to the center member, a securing member adjustably threaded to said spring, said securing member having its lower end portion reduced in diameter to form a shoulder, a top sealing plate having an aperture about said securing member and being disposed against the shouldered portion, and a filter element clamped between said sealing plates, said element being sufficiently rigid axially of the center tube to withstand clamping pressure.

4. In a liquid filter device, a casing, a base for the casing having a central outlet opening and an inlet opening, and a securing bolt passing downwardly through the casing and into the base, and, in combination therewith, a filtering unit comprising a shouldered hollow center member fitted into the outlet opening and surrounding the securing bolt in spaced relation thereto, a bottom sealing plate having a centered aperture fitting on said tube and abutting the shouldered portion thereof, a tension spring secured to the center tube, a threaded securing member closely fitting the securing bolt and fixed to said spring, a securing element threaded on said member, a top sealing plate having an aperture through which the securing member extends, a nut turned onto said threaded securing element to press against the top sealing plate for urging the sealing plates axially together, a filter element clamped between said sealing plates, said filter element being corrugated in cross-section to afford a large filtering area and being sufficiently rigid axially of the center tube to withstand clamping pressure, said sealing plates being provided with flanges about and overlapping the filtering element to confine the element against radial expansion, and sealing gaskets positioned on the inner surfaces of the sealing plates and abutting the ends of the filter element to provide a liquid-tight seal.

5. A liquid filtering unit comprising a hollow center tube, a sealing plate fitting on said tube, a tension spring secured to the center tube, a threaded member secured to said spring, a securing element adjustably threaded to said member, said element having a shouldered end portion, a second sealing plate having an aperture mounted on said threaded member against the shouldered portion of said securing element, and a filter element clamped between said sealing plates, said filter element being sufficiently rigid axially of the center tube to withstand clamping pressure.

6. A liquid filtering unit comprising a hollow center tube, a bottom sealing plate fitting on said element, a tension spring secured to the center tube, a threaded member secured to said spring, a securing element adjustably threaded to said member, a top sealing plate having an aperture mounted on said threaded member against the securing element, and a filter element clamped between said sealing plates, said filter element being sufficiently rigid in the direction of the center tube to withstand clamping pressure.

7. In a liquid filter having a casing, a base for the casing having a central outlet opening and an inlet opening, and a securing bolt passing downwardly through the casing and into the base, and, in combination therewith, a filtering unit comprising a shouldered hollow center element fitted into the outlet opening and surrounding the securing bolt in spaced relation thereto, a bottom sealing plate having a centered aperture fitted on said tube and abutting the shouldered portion thereof, a tension spring secured to the center tube, a securing element closely fitting the securing bolt and adjustably threaded to said spring, said element having a shouldered end portion, a top sealing plate having an aperture through which the securing element extends, a filter element clamped between said sealing plates and having opposite ends respectively pressed against by said plates, said element being corrugated in cross-section to afford a large filtering area and being sufficiently rigid axially of the center tube to withstand clamping pressure, said sealing plates being provided with flanges overlapping the ends of the filtering element to confine the element against radial expansion, and sealing gaskets positioned on the inner surfaces of the sealing plates and abutting the ends of the filter element to provide a liquid-tight seal.

DALE L. BENNETT.